Dec. 8, 1953   F. A. SUNDERHAUF ET AL   2,662,002
METHOD OF EMBOSSING ROLLS
Filed Feb. 14, 1951   4 Sheets-Sheet 1
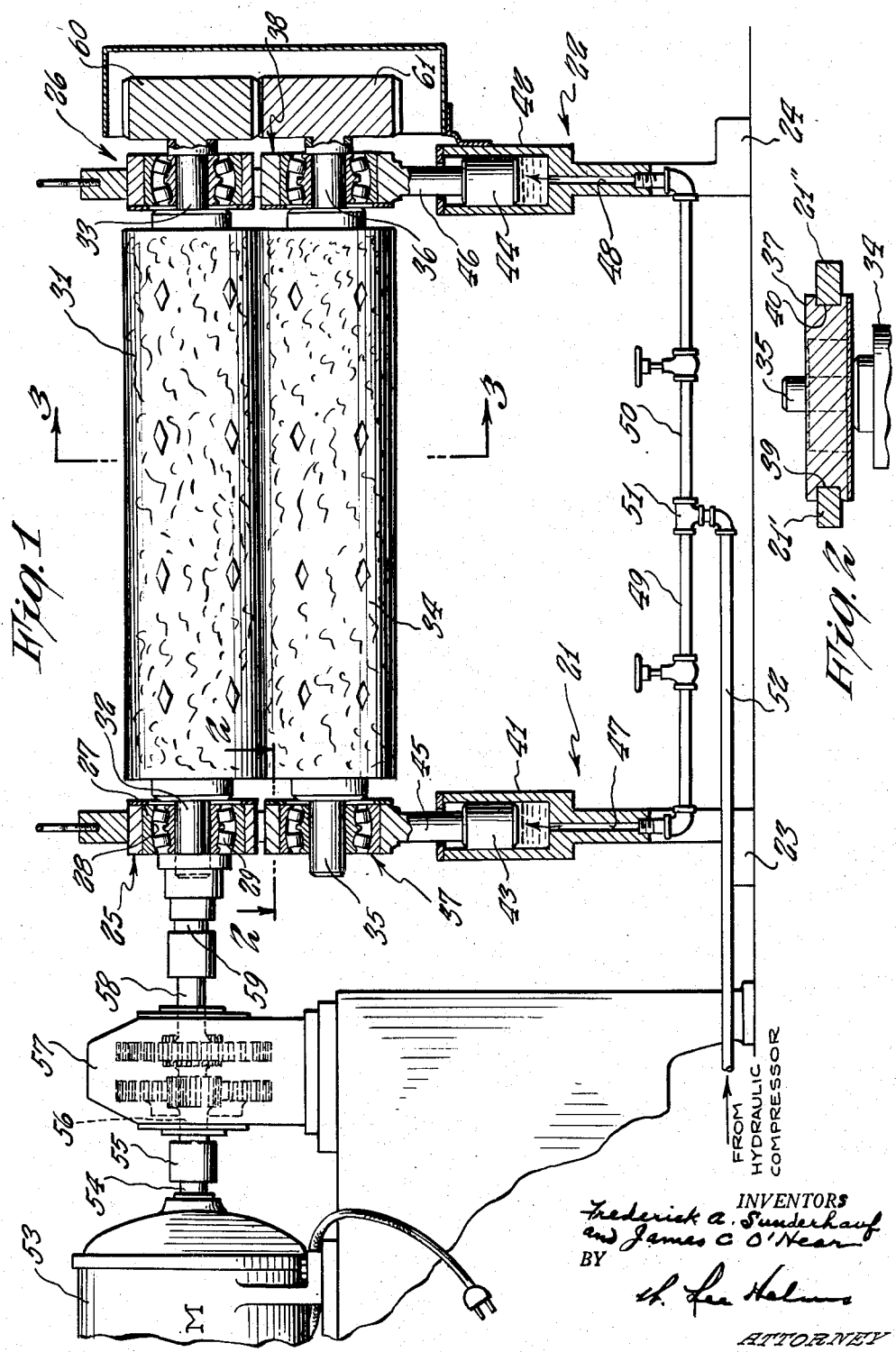
INVENTORS
Frederick A. Sunderhauf
and James C. O'Hear
BY
H. Lee Helms
ATTORNEY Dec. 8, 1953     F. A. SUNDERHAUF ET AL     2,662,002
METHOD OF EMBOSSING ROLLS
Filed Feb. 14, 1951                         4 Sheets-Sheet 2

INVENTORS
Frederick A. Sunderhauf
and James C. O'Hear
BY
W. Lee Helms
ATTORNEY

Dec. 8, 1953  F. A. SUNDERHAUF ET AL  2,662,002
METHOD OF EMBOSSING ROLLS
Filed Feb. 14, 1951  4 Sheets-Sheet 3
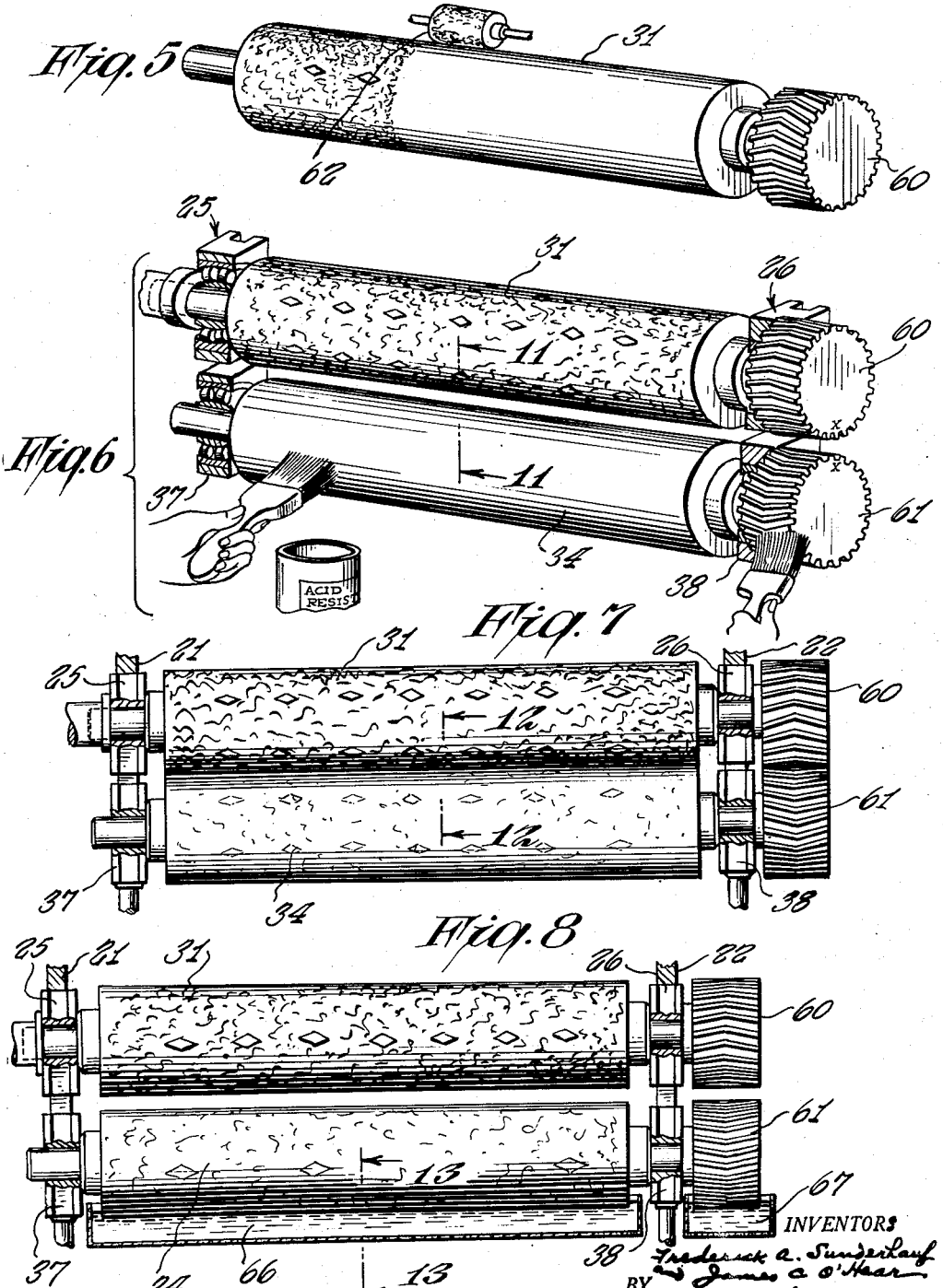

Dec. 8, 1953  F. A. SUNDERHAUF ET AL  2,662,002
METHOD OF EMBOSSING ROLLS
Filed Feb. 14, 1951  4 Sheets-Sheet 4
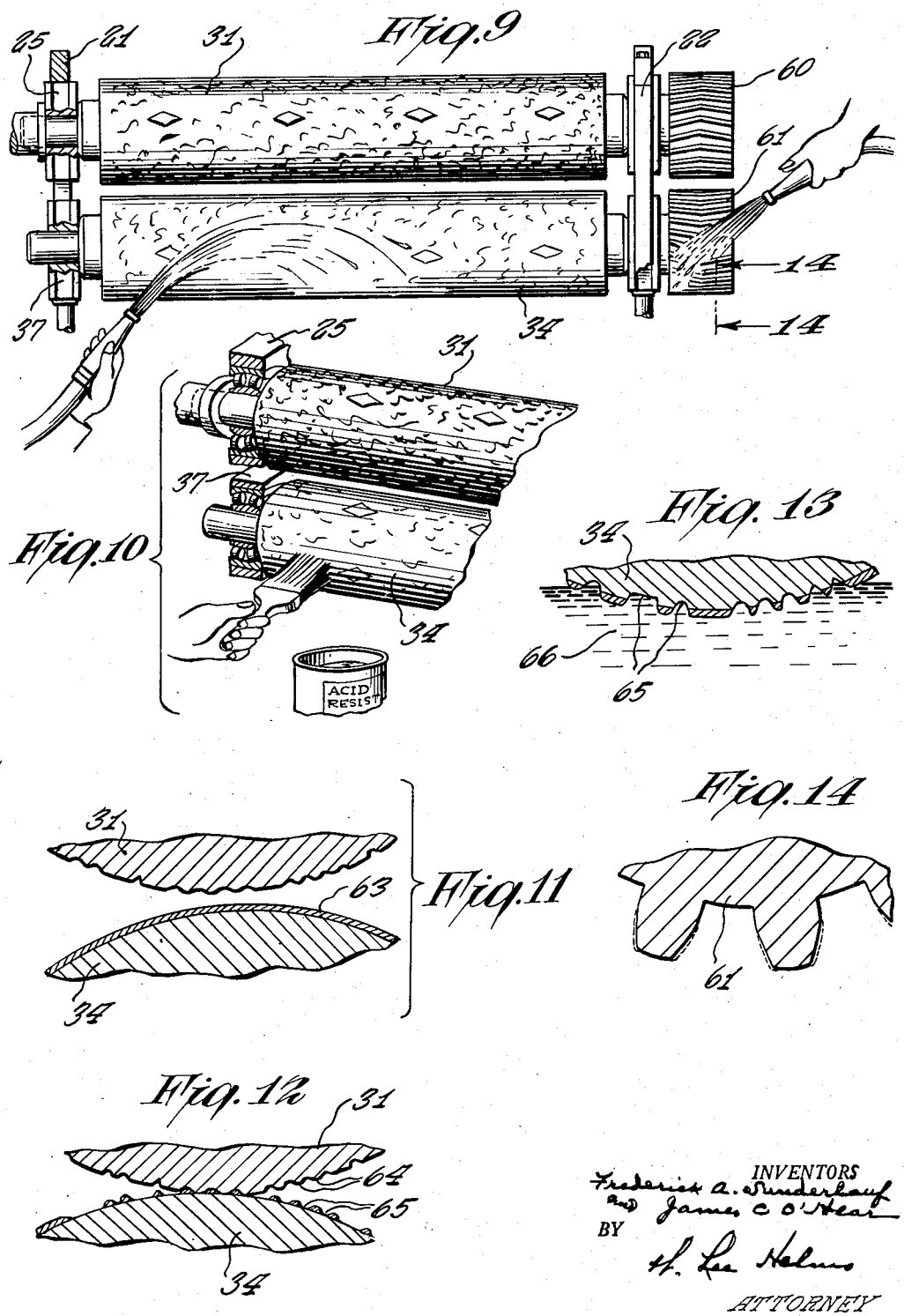

Patented Dec. 8, 1953

2,662,002

UNITED STATES PATENT OFFICE 2,662,002

METHOD OF EMBOSSING ROLLS

Frederick A. Sunderhauf, Summit, and James C. O'Hear, Union, N. J.

Application February 14, 1951, Serial No. 210,885

4 Claims. (Cl. 41—43)

This invention relates to the art of roll embossing and, more particularly, to an embossing apparatus having a pair of embossing rolls through which a sheet of material is passed so as to form a raised or embossed design or pattern on the material, and also to a novel method of making the embossing rolls.

Heretofore the prior art of roll embossing has involved the use of apparatus and methods which were entirely unsatisfactory in that the embossed sheet material was frequently characterized by tears, wrinkles and non-uniformity of the embossed design. Furthermore, the embossing rolls were subject to rapid wear and frequent breakdown. Also, the prior art methods for making the embossing rolls were unduly expensive, time consuming and unreliable.

The roll embossing apparatus of the present invention obviates the above-noted defects by means of several novel features. We have discovered that the tendency of the sheet material to be torn or wrinkled during the embossing operation is considerably reduced by providing clearance between the sheet material and the bottoms and sides of the recesses in the embossing surface of one of the rolls; that is, the sheet material is maintained out of contact with the bottoms and sides of said recesses as the material is passed between the rolls during the embossing operation.

Another novel feature of the present invention resides in the provision of a crown or taper on at least one of the embossing rolls. This provides for a straight line of contact between the rolls when the latter are in engagement under pressure. The crowned contour of the roll counteracts the distortion due to its flexural deflection, thereby producing said straight line of contact along which the roll pressures will be substantially equal.

Another important feature of the present invention resides in the novel hydraulic means for mounting the rolls so that equal and/or variable pressure is maintained along the line of contact of the rolls irrespective of irregularities in the sheet material or other accidental factors.

Since it is necessary to assure that the embossing projections of one roll are always maintained in correct alignment with respect to the embossing recesses in the other roll, still another important feature of the invention resides in the novel method of engraving or matching the synchronising gears of the rolls simultaneous with the formation of the embossing surfaces. These gears are so perfectly matched by the present method of making the rolls that the proper exact angular orientation of the rolls with respect to each other, and hence the correct alignment of the projections of one roll with the recesses of the other roll, is always maintained.

Other novel features and advantages of the present invention will be apparent from the disclosure of the specific embodiment described in detail hereinbelow and shown in the drawings, wherein:

Fig. 1 is a partially sectioned side elevational view of the apparatus;

Fig. 2 is a horizontal sectional view taken on the line 2—2 of Fig. 1 and showing the arrangement for slidably mounting one of the roll bearing means;

Fig. 3 is a sectional perspective view of the right-hand end of the apparatus taken substantially on the line 3—3 of Fig. 1;

Fig. 4 is a vertical detail sectional view taken on the line 4—4 of Fig. 3 and showing the relationship of the sheet material being embossed to an embossing projection of the upper roll and an embossing recess of the lower roll;

Figs. 5 to 10 inclusive are views of the embossing rolls illustrating the several steps of the method of making them;

Fig. 5 shows an embossing surface being formed on the upper roll;

Fig. 6 shows the lower roll and its gear being coated with an acid-resistant material;

Fig. 7 shows the configuration of the embossing surface of the upper roll being impressed into the acid-resistant material coating of the lower roll by running the two rolls together under pressure;

Fig. 8 shows the lower roll and its gear being dipped into an acid bath;

Fig. 9 shows the step of washing the acid from the lower roll and its gear;

Fig. 10 shows the outermost portions of the lower roll being coated with acid-resistant material preparatory to dipping the lower roll into an acid bath so as to deepen and widen the embossing recesses, thereby providing said clearance feature;

Fig. 11 is a sectional view taken on the line 11—11 of Fig. 6 and shows the surfaces of the rolls after the lower roll has been coated with acid-resistant material and before the rolls have been brought into engagement;

Fig. 12 shows the acid-resistant coating of the lower roll impressed with the configuration of the embossing surface of the upper roll, Fig. 12 being taken substantially on the line 12—12 of Fig. 7;

Fig. 13 is a sectional view showing the lower roll being dipped into the acid bath which eats away those portions of the roll surface which are devoid of acid-resistant material so as to form recesses at said portions, Fig. 13 being taken substantially on the line 13—13 of Fig. 8;

Fig. 14 is a sectional view of a portion of the gear of the lower roll showing in dotted lines the original outline of the gear teeth before the gear has been engraved so as to match the gear of the upper roll, Fig. 14 being taken substantially on the line 14—14 of Fig. 9;

Fig. 15 is a side elevational view of the rolls showing the crown or tapered contour of the lower roll in exaggerated form; and Fig. 16 is a view similar to Fig. 15 but showing the rolls in contact under normal embossing pressure, the lower crowned roll undergoing flexural deflection so as to provide a straight line of contact along which the roll pressures are substantially equal.

Referring first to Fig. 1, the apparatus comprises a pair of vertical frame members or supports 21, 22 each having a base portion 23, 24 adapted to rest upon the floor. As shown in Fig. 3, the supports 21, 22 are held in rigid relationship with respect to each other by four brace members 20 extending horizontally between the supports 21, 22 and secured thereto at their opposite ends. At the upper portion of the support 21 a bearing means 25 is fixedly secured therein and a second bearing means 26 is secured to the upper portion of the support 22 and in alignment with the bearing means 25.

The bearing means 25, 26 may be of any suitable type but are preferably of the tapered roller type, each comprising an outer sleeve 27 having an arcuate interior surface 28 against which a plurality of rollers 29 are adapted to ride. The rollers 29 also engage at their inner portions a sleeve 30.

The bearing means 25, 26 rotatably support an upper embossing roll 31 in the following manner: The left-hand end of the roll 31 is provided with a shaft 32 press fitted within or otherwise fixedly secured within the sleeve 30 of bearing means 25 and the right-hand end of the roll 31 is similarly provided with a shaft 33 fixedly secured within the sleeve 30 of bearing means 26.

A second embossing roll 34 extends beneath and parallel to the upper roll 31. The lower roll 34 is provided at its opposite ends with shafts 35, 36 each rotatably mounted within a respective one of a second pair of bearing means 37, 38 in the same manner as described above with respect to the shafts 32, 33 of the upper roll 31, except that lateral adjustment is provided on bottom bearing for side register of engraved pattern.

As best seen in Fig. 2, the bearing means 37, 38 are vertically reciprocable toward and away from the axis of the upper roll 31. That is, the bearing means 37, 38 are slidably mounted for vertical movement with respect to the supports 21, 22 in the following manner which, for purposes of brevity, will be described only with reference to bearing means 37 and support 21. As shown in Fig. 2, the support 21 is slotted or bifurcated so as to provide two parallel vertical trackways 21', 21". The bearing means 37 is provided at its opposite vertical sides with grooves 39, 40 adapted to receive and slidably engage the trackways 21', 21" respectively. As shown in Fig. 3, the bearing means 38 is similarly slidably mounted between the vertical trackways 22', 22" of the frame support 22.

Each of the supports 21, 22 is provided with a cylinder 41, 42. Pistons 43, 44 are vertically reciprocable within the cylinders 41, 42, each of the pistons 43, 44 being fixedly connected to a respective one of the bearing means 37, 38 by means of piston rods 45, 46.

It will thus be seen that fluid under pressure may be introduced into the cylinders 41, 42 so as to actuate the pistons 43, 44 and thereby move the bearing means 37, 38 (and hence also the lower roll 34) upwardly toward the upper roll 31. In order to supply such fluid pressure to the cylinders 41, 42, the supports 21, 22 are provided with vertical channels 47, 48 communicating at their upper ends with the cylinders 41, 42 and at their lower ends with pipes 49, 50 which in turn communicate with a T pipe coupling 51 to which a common supply pipe 52 is connected at one end. The other end of the pipe 52 is connected to a hydraulic compressor (not shown) or other suitable means for supplying fluid under pressure through the pipes 52, 49, 50 to the cylinders 41, 42. The pressure of the fluid may be selectably controlled at any predetermined amount for a purpose to be described below.

A conventional electric motor 53 is provided with an output drive shaft 54 coupled at 55 to the input shaft 56 of a gear reduction unit 57. The output shaft 58 of the gear reduction unit 57 is drivingly connected by a suitable coupling 59 to the left-hand shaft 32 of the upper roll 31. It will thus be seen that actuation of the motor 53 causes rotation of the upper roll 31 within the bearing means 25, 26.

The right-hand shaft 33 of the upper roll 31 is provided with a gear 60, preferably of the herringbone type, which engages a similar gear 61 secured to the right-hand shaft 36 of the lower roll 34. This gearing arrangement assures that the lower roll 34 will be drivingly rotated in synchronism with the upper roll 31 as the latter is rotated by the motor 53.

The novel method of making the embossing rolls 31, 34 will now be described. Referring first to Fig. 5, the upper roll 31 is provided with an exterior embossing surface before it is assembled to the apparatus. This embossing surface is applied to the roll 31 by means of a master roll die 62 in a conventional manner which is well known in the art and need not be described.

Referring now to Fig. 6, the upper roll 31, already provided with an embossing surface, is assembled to the apparatus by being rotatably mounted within bearing means 25, 26. The upper roll 31 is preferably hardened after being provided with the embossing surface and therefore has a higher modulus of elasticity than the relatively softer lower roll 34. This greater modulus of elasticity of the upper roll 31 results in the upper roll 31 remaining straight and undeflected while the lower roll 34 undergoes flexural deflection when the rolls are placed in operating engagement under pressure, as will be explained in more detail below. It is to be understood, however, that both rolls 31, 34 may be of equal hardness and hence deflect equally or, the lower roll 34 may be harder than the upper roll 31 whereby the upper roll 31 will undergo substantially all of the flexural deflection while the lower roll 34 remains straight and undeflected, without departing from the scope of the present invention.

After the rolls 31, 34 have been assembled to the apparatus, the hydraulic compressor is adjusted so as to provide practically no pressure beneath the pistons 43, 44, thereby allowing the bearing means 37, 38 and the roll 34 to slide downwardly away from the upper roll 31 under the action of gravity. The exterior surface of the lower roll 34 and also the toothed surface of its gear 61 are then coated with an acid-resistant material. The acid-resistant material may be manually applied with a brush, as shown in Fig. 6, or may be applied by applicator rolls or other suitable means. As shown in Fig. 11, the exterior surface of the lower roll 34 is now coated with a layer 63 of acid-resistant material.

The hydraulic compressor is now actuated so as to introduce fluid under pressure into the cylinders 41, 42, thereby actuating the pistons 43, 44 upwardly so as to cause the lower roll 34 to contact the upper roll 31 under a predetermined pressure. While the rolls 31, 34 are in contact under pressure, the motor 53 is actuated so as to rotate the rolls 31, 34 and thereby cause the configuration of the embossing surface of the upper roll 31 to be impressed into the acid-resistant coating 63 on the lower roll 34. This impression transfer from the upper roll 31 to the coating 63 occurs in the following manner. The embossing surface of the upper roll 31 is provided with a plurality of embossing projections. During the rotation of the rolls 31, 34 under pressure contact, these embossing projections dig into the acid-resistant coating 63 so as to displace the coating material and thereby render portions of the lower roll 34 devoid of acid-resistant material and therefore exposed. For instance, in Fig. 12 the embossing projections of the upper roll 31 are indicated at 64 and the corresponding portions of the lower roll 34, which portions have been rendered exposed and devoid of acid-resistant material by the projections 64, are indicated at 65.

The hydraulic pressure within the cylinders 41, 42 is then released and the lower roll 34 is allowed to move downwardly out of contact with the upper roll 31 and into an acid bath 66 (Fig. 8). As shown in Fig. 13, the acid 66 eats away the metal at the portions 65 which have been rendered bare of acid-resistant material. Hence the bare or exposed portions 65 of the lower roll 34 are formed into recesses, each corresponding to a respective one of the embossing projections on the upper roll 31.

It will be noted that the gear 61 of the lower roll 34 has also been coated with acid-resistant material and run in engagement with gear 60 of upper roll 31. The acid-resistant coating on the gear 61 is thus worn away at those portions which are provided with too much metal to result in a perfect match with gear 60. As shown in Fig. 8, the gear 61 is submerged within an acid bath 67 simultaneously with the submersion of the lower roll 34 within the acid bath 66, thereby causing the acid 67 to eat away said portions of the gear 61. It will thus be seen that by successive coating and acid etching operations of the gear 61, there will eventually result an almost perfect match or mating engagement of the gears 60, 61. Furthermore, since the gears 60, 61 are matched simultaneously with the transfer of the embossing configuration of the upper roll 31 to the lower roll 34, it will be seen that the gears 60, 61 maintain the embossing projections of the upper roll 31 in the original exact alignment with respect to the corresponding embossing recesses in the lower roll 34.

Referring now to Fig. 9, the lower roll 34 and its gear 61 are then washed so as to remove the acid therefrom. The lower roll 34 (and also its gear 61) are again coated with acid-resistant material and the above-described cycle of steps shown in Figs. 6 to 9 is repeated. The number of repetitions of this cycle of steps necessary to complete the transfer of the configuration of the embossing surface of roll 31 to roll 34 depends upon various factors such as the acid resistance of the material of roll 34, the hardness of the material, the strength of the acid, the length of time during which the lower roll 34 is submerged within the acid, the depth of the embossing surface, and the like. After a sufficient number of repetitions the surface of the lower roll 34 will be provided with a plurality of embossing recesses, each corresponding in size and shape to a respective one of the embossing projections on the exterior surface of the upper roll 31.

Referring to Fig. 6, it will be noted that each of the gears 60, 61 is provided with an indicator mark as at X. Whenever the rolls 31, 34 and gears 60, 61 are brought into engagement the indicator marks are placed in opposite adjacent relation, thereby always maintaining the rolls 31, 34 in the same angular orientation with respect to each other during the transfer of the embossing configuration of the roll 31 to the roll 34 and also during the embossing operation of the apparatus. It will thus be seen that each embossing projection on the roll 31 always coacts with the same corresponding embossing recess of the roll 34.

Referring now to Figs. 15 and 16, the method of crowning or tapering at least one of the rolls, and the advantages of such crown shape, will now be described. As noted above, the configuration of the embossing surface of upper roll 31 is impressed upon the acid-resistant coating of lower roll 34 while the two rolls are being rotated and while hydraulic pressure is exerted upwardly on the bearing means 37, 38. Since the rolls are supportably mounted at their opposite ends, it will be seen that during this impression transfer operation the rolls act as simple beams having a transverse load along their span. That is, there will be a tendency for the upper roll 31 to deflect upwardly and for the lower roll 34 to deflect downwardly, thereby resulting in the bearing pressure between the rolls at their ends being greater than the bearing pressures which exist along their intermediate portions. Since the bearing pressures during the impression transfer step shown in Fig. 7 are greater at the ends of the rolls, it will be obvious that the embossing projections of the upper roll 31 will dig deeper into the acid-resistant roll material on roll 34 at the ends of the rolls than at the intermediate portions thereof. Therefore, the first several series or cycles of coating and etching steps will result in the acid eating away solely the metal at the opposite ends of the lower roll 34. During the successive cycles the metal of the lower roll 34 will be etched at points successively inwardly toward the center of the roll 34 until after the final cycle or series of coating or etching steps, the surface of the lower roll 34 at the center thereof will have been provided with embossing recesses of a depth equal to the height of the corresponding embossing projections of the upper roll 31. Since the etching effect on the lower roll 34 begins at its opposite ends and then occurs at successive inward points during successive etching steps, it will be obvious that the exterior surfaces of the lower roll 34 will become crowned or tapered as shown in Fig. 15. That is, the diameter of the roll 34 at its center will be greater than the diameter at its opposite ends, the roll tapering in a somewhat arcuate manner from its center to said opposite ends.

Fig. 16 shows the effect of this crown or tapered contour of the lower roll 34 when the rolls are in contact and operating under normal embossing pressure. Since the roll 31 is harder than the lower roll 34, its modulus of elasticity is greater than that of the roll 34, and therefore an equal flexural stress on both of the rolls 31, 34 will result in the upper roll remaining substantially straight and undeflected while the lower roll 34 deflects in the manner shown. It will thus be seen that, notwithstanding the flexural deflection caused by the stress resulting from the bearing pressures placed upon the rolls, the rolls will contact along a straight line, as at the contacting surfaces 31', 34' of the rolls 31, 34 respectively. The deflection of the lower roll 34 has caused the contacting surface 34', which is normally of arcuate or crowned shape as in Fig. 15, to assume a rectilinear shape as shown in Fig. 16. Furthermore, by properly adjusting the extent of the crown or taper of the lower roll 34, the bearing pressures between the rolls 31, 34 are substantially equal at all points along the line of contact.

As stated above, one of the important features of the present invention resides in the provision of a clearance between the work-piece or sheet material being passed through the rolls 31, 34 and the recesses in the lower roll 34. This clearance arrangement is shown in Fig. 4 wherein the sheet material being embossed is indicated at S. The reference numeral 64 indicates an embossing projection on the surface of the upper roll 31 and the reference numeral 65 indicates a corresponding embossing recess on the surface of the lower roll 34. It will be seen that the recess 65 is somewhat deeper and wider than the projection 64 whereby the sheet S is maintained out of contact with the bottom and sides of the recess 65.

The clearance between the sheet S and the bottoms and sides of the recesses 65 provides several advantageous results. In addition to preventing gripping, tearing and distorting of the sheet, wear and breakdown of the rolls is considerably reduced when the rolls are employed for embossing sheet metal. Furthermore, by maintaining the raised parts of the embossed design out of contact with the lower roll 34 these parts are not "worked" and hence retain their original color and texture, thereby providing the raised parts with a dull surface contrasting with the relatively smooth shiny surface of the non-raised parts of the embossed design, this contrast resulting in a distinctive pleasing appearance of the embossed sheet.

The method of obtaining this clearance will now be described with reference to Fig. 10. After the last repetition of the cycle of steps shown in Figs. 6 to 9, the raised or outermost portions of the lower roll 34 are coated with acid-resistant material, thereby leaving the bottoms and sides of the recesses exposed. The lower roll 34 is then dipped into an acid bath which eats away the metal at the bottoms and sides of the recesses, thereby rendering the recesses deeper and wider than the respective projections of the upper roll 31. The acid is then washed off and the embossing rolls 31, 34 are now completed and ready for operation.

The mode of operation of the apparatus will now be described. The hydraulic compressor is actuated to supply fluid to the cylinders 41, 42 at the desired pressure at which the embossing operation is to occur. The hydraulic pressure urges the lower roll 34 upwardly and into engagement with the upper roll 31, the gears 60, 61 being thereby engaged. The motor 53 is connected to a suitable electrical power source so as to rotate the rolls 31, 34. A sheet of material S (Fig. 3) is then fed between the rolls 31, 34 which emboss a raised pattern or design thereon as the sheet S is continuously drawn through the rolls in the manner shown in Fig. 3.

It will thus be seen that the novel features of the present invention, including the clearance between the sheet material and the bottoms and sides of the embossing recesses, the hydraulic means for bringing the rolls into pressure contact, the crown contour of at least one roll and the matched engraved gears, cooperate to maintain the embossing projections of one roll in proper relation with respect to their corresponding recesses in the other roll, thereby preventing the tearing, wrinkling and other defects in the embossed sheet and the rapid wear and breakdown of the rolls heretofore prevalent in the prior art of roll embossing.

It is to be understood that the specific embodiment of the invention shown in the drawing and described in the specification is intended to be merely illustrative of one of the many forms which the invention may take in practice and is not intended to limit the scope of the invention, the latter being delineated in the appended claims. While the specification describes applying the hydraulic pressure against the lower roll, a hydraulic pressure system may be applied against the upper roll. With such procedure the lower roll would normally be in a fixed position.

Having described our invention what we claim and desire to secure by Letters Patent is as follows:

1. The method of making a pair of mated steel embossing rolls comprising embossing a top relatively soft roll with a master roll die to produce a top embossed roll having embossing projections thereon, fixedly securing permanently a helical gear to said embossed top roll, said gear having substantially the same diameter of said roll, coating said embossed top roll and the gear affixed thereto with a wax material, securing permanently a helical gear to a bottom roll, the diameter of said gear and of said bottom roll being substantially equal, contacting said coated embossed roll under variable pressure with said bottom roll to effect a crown on said bottom roll by end contacting of said top and bottom rolls to produce waxed and unwaxed areas on said bottom roll, lowering said pressure waxed bottom roll with its first gear into an acid bath adapted to eat away metal from the unwaxed areas thereon, recoating said top roll with said wax material and again pressure contacting said recoated top roll with the bottom roll but with a pressure greater than that used previously, repeating said recoating and increased pressure contacting to produce a mated bottom roll adapted to completely receive the top roll embossing projections, and acid treating said bottom roll to produce a predetermined clearance between the embossing projections of the top roll and their mated recesses in the bottom roll.

2. The method of making a pair of mated steel embossing rolls comprising embossing a top relatively soft roll with a master roll die to produce a top embossed roll having embossing projections thereon, hardening said top roll embossed surface, fixedly securing permanently a helical gear to said embossed top roll, said gear having substantially the same diameter of said roll, coating said embossed top roll and the gear affixed thereto with a wax material, securing permanently a helical gear to a botom roll, the diameter of said gear and of said bottom roll being substantially equal, contacting said coated embossed roll under variable pressure with said bottom roll to effect a crown on said bottom roll by end contacting of said top and bottom rolls to produce waxed and unwaxed areas on said bottom roll, lowering said pressure waxed bottom roll with its first gear into an acid bath adapted to eat away metal from the unwaxed areas thereon, recoating said top roll with said wax material and again pressure contacting said recoated top roll with the bottom roll but with a pressure greater than that used previously, repeating said recoating and increased pressure contacting to produce a mated bottom roll adapted to completely receive the top roll embossing projections, and acid treating said bottom roll to produce a predetermined clearance between the embossing projections of the top roll and their mated recesses in the bottom roll.

3. The method of making a pair of mated steel embossing rolls comprising engraving a top relatively soft roll with a conventional small round steel engraving die or mill to produce a top embossing roll having engraved projections thereon, fixedly securing a helical gear to said engraved top roll said gear having substantially the same diameter of said roll, securing a helical gear to a bottom roll, the diameter of said gear and of said bottom roll being substantially equal, coating said bottom roll and the gear affixed thereto with a wax material, contacting said coated bottom roll under a predetermined operating pressure with said engraved top roll to effect roll deflection and cutting through contacted wax area, lowering said bottom roll with its gear into an acid bath adapted to eat away metal from the exposed areas of the roll and gear, recoating said bottom roll with said wax material and again pressure contacting said recoated bottom roll with the engraved top roll, repeating said recoating and etching to produce a mated bottom roll adapted to completely receive the embossing projections of the top roll, and acid treating said bottom roll to produce a predetermined clearance between the embossing projections of the top roll and their mated recesses in the bottom roll.

4. The method of making a pair of mated steel embossing rolls comprising engraving a top relatively soft roll with a conventional small, round steel engraving die or mill to produce an engraved top roll having embossing projections thereon, hardening the engraved surface of said top roll, fixedly securing a helical gear to said engraved top roll said gear having substantially the same diameter of said roll, securing a helical gear to a bottom roll, the diameter of said gear and of said bottom roll being substantially equal, coating said bottom roll and gear affixed thereto with a wax material, contacting said engraved top roll under pressure with said bottom roll to effect roll deflection and cutting through wax area, lowering said waxed bottom roll with its gear into an acid bath adapted to eat away metal from the unwaxed areas thereon, recoating said lower roll with said wax material and again pressure contacting the engraved top roll with the wax coated bottom roll but with a pressure greater than that used previously to effect a predetermined crown, repeating said recoating and increased pressure contacting to produce a mated bottom roll with crown adapted to completely receive the top roll engraved projections and acid treating said bottom roll to produce a predetermined clearance between the engraved projections of the top roll and their mated recesses in the bottom roll.

FREDERICK A. SUNDERHAUF.
JAMES C. O'HEAR.

References Cited in the file of this patent
UNITED STATES PATENTS

| Number | Name | Date |
| --- | --- | --- |
| Re. 6,470 | Schuyler | June 1, 1875 |
| 681,727 | Offenbacher | Sept. 3, 1901 |
| 1,261,903 | Brown | Apr. 9, 1918 |
| 1,394,016 | Howe | Oct. 18, 1921 |
| 1,804,024 | Nicolas et al. | May 5, 1931 |
| 2,346,230 | Ormond | Apr. 11, 1944 |

OTHER REFERENCES

Waldron Embossing Machines, published New Brunswick, N. J. Bulletin No. 102 (p. 5, lines 3–7, also p. 7, line 34).